(12) United States Patent
Cocchi et al.

(10) Patent No.: US 10,123,553 B2
(45) Date of Patent: Nov. 13, 2018

(54) MACHINE AND METHOD FOR MAKING LIQUID OR SEMI-LIQUID PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.p.A.—CARPIGIANI GROUP, Milan (IT)

( * ) Notice: Subject to any disclaimer, the term of this patent is extended or adjusted under 35 U.S.C. 154(b) by 0 days.

(21) Appl. No.: 14/993,767

(22) Filed: Jan. 12, 2016

(65) Prior Publication Data
US 2016/0205966 A1 Jul. 21, 2016

(30) Foreign Application Priority Data
Jan. 16, 2015 (IT) .............................. BO2015A0013

(51) Int. Cl.
*A23G 9/10* (2006.01)
*A23G 9/12* (2006.01)
(Continued)

(52) U.S. Cl.
CPC .................. *A23G 9/10* (2013.01); *A23G 9/08* (2013.01); *A23G 9/12* (2013.01); *A23G 9/281* (2013.01); *A23G 9/282* (2013.01)

(58) Field of Classification Search
CPC . A23G 9/10; A23G 9/08; A23G 9/282; A23G 9/228; A23G 9/12
(Continued)

(56) References Cited

U.S. PATENT DOCUMENTS 2,746,260 A * 5/1956 Swenson ................ A23G 9/163
222/640
3,276,633 A * 10/1966 Rahauser ............... A23G 9/281
222/129.1
(Continued)

FOREIGN PATENT DOCUMENTS

EP  2649883 A1  10/2013
EP  2801261 A1  11/2014
(Continued)

OTHER PUBLICATIONS

Italian Search Report dated Apr. 30, 2015 from counterpart IT application No. BO2015A000013.

*Primary Examiner* — Eric Stapleton
(74) *Attorney, Agent, or Firm* — Shuttleworth & Ingersoll, PLC; Timothy Klima

(57) ABSTRACT

A machine for making liquid and semi-liquid products includes a first container and first mixer for processing a basic product and a second container and second mixer for converting the basic product into a desired product. First and second heat exchangers are operatively associated respectively with the first and second containers. First and second drive units respectively drive the first and second mixers. A connecting duct allows transfer of the basic product from the first container to the second container. A separating element is associated with the duct and switchable between a separating configuration in which the transfer of basic product from the first container to the second container through the duct is prevented, and a connecting configuration in which a transfer of basic product from the first container to the second container through the duct is allowed.

9 Claims, 1 Drawing Sheet

(51) Int. Cl.
*A23G 9/08* (2006.01)
*A23G 9/28* (2006.01)

(58) Field of Classification Search
USPC .......................................................... 99/453
See application file for complete search history.

(56) References Cited

U.S. PATENT DOCUMENTS

| | | | | | |
|---|---|---|---|---|---|
| 3,477,393 | A | * | 11/1969 | Bell | A23G 9/282 |
| | | | | | 425/131.1 |
| 3,517,524 | A | * | 6/1970 | Fiedler | A23G 9/045 |
| | | | | | 222/129.1 |
| 4,201,558 | A | * | 5/1980 | Schwitters | A23G 9/045 |
| | | | | | 137/594 |
| 4,314,451 | A | * | 2/1982 | Leeds | A23B 4/066 |
| | | | | | 62/136 |
| 4,504,511 | A | * | 3/1985 | Binley | A21C 3/08 |
| | | | | | 264/209.2 |
| 4,637,221 | A | * | 1/1987 | Levine | A23G 9/28 |
| | | | | | 366/286 |
| 4,703,628 | A | * | 11/1987 | Togashi | A23G 9/163 |
| | | | | | 222/55 |
| 4,747,272 | A | * | 5/1988 | Howell | A23G 9/12 |
| | | | | | 137/101.21 |
| 4,813,347 | A | * | 3/1989 | Yoshida | A23C 20/025 |
| | | | | | 99/453 |
| 4,881,663 | A | * | 11/1989 | Seymour | A23G 9/282 |
| | | | | | 222/132 |
| 4,947,742 | A | * | 8/1990 | Nishibayashi | A23C 20/025 |
| | | | | | 99/453 |
| 4,964,542 | A | * | 10/1990 | Smith | A23G 9/04 |
| | | | | | 222/146.6 |
| 5,158,506 | A | * | 10/1992 | Kusano | A23G 9/163 |
| | | | | | 62/136 |
| 5,159,818 | A | * | 11/1992 | Etou | A23G 9/045 |
| | | | | | 222/138 |
| 5,481,968 | A | * | 1/1996 | Clem | A23G 3/021 |
| | | | | | 137/101.19 |
| 5,709,095 | A | * | 1/1998 | Johnson | A23G 9/045 |
| | | | | | 366/311 |
| 6,370,892 | B1 | * | 4/2002 | Ross | A23G 9/08 |
| | | | | | 62/136 |
| 6,490,872 | B1 | * | 12/2002 | Beck | A23G 9/045 |
| | | | | | 62/303 |
| 6,651,448 | B2 | * | 11/2003 | Ross | A23G 9/16 |
| | | | | | 62/342 |
| 6,662,592 | B2 | * | 12/2003 | Ross | A23G 9/12 |
| | | | | | 165/156 |
| 6,735,967 | B1 | * | 5/2004 | Bischel | A23G 9/08 |
| | | | | | 62/196.4 |
| 7,017,784 | B2 | * | 3/2006 | Ross | A23G 9/22 |
| | | | | | 222/367 |
| 7,047,758 | B2 | * | 5/2006 | Ross | A23G 9/12 |
| | | | | | 366/285 |
| 7,857,910 | B2 | * | 12/2010 | Carhuff | A47J 31/401 |
| | | | | | 134/18 |
| 7,895,845 | B2 | * | 3/2011 | Every | F25C 5/08 |
| | | | | | 62/151 |
| 8,196,423 | B2 | * | 6/2012 | Elsom | A23G 9/28 |
| | | | | | 62/342 |
| 2006/0090654 | A1 | * | 5/2006 | Mange | A23G 3/0063 |
| | | | | | 99/494 |
| 2007/0194045 | A1 | * | 8/2007 | Py | B65B 39/004 |
| | | | | | 222/105 |
| 2007/0295750 | A1 | * | 12/2007 | Cocchi | A23G 9/045 |
| | | | | | 222/145.6 |
| 2008/0073376 | A1 | * | 3/2008 | Gist | A23G 9/045 |
| | | | | | 222/145.5 |
| 2011/0120163 | A1 | * | 5/2011 | Wadle | A23G 9/228 |
| | | | | | 62/228.1 |
| 2012/0312049 | A1 | * | 12/2012 | Downs, III | A23G 9/20 |
| | | | | | 62/340 |

FOREIGN PATENT DOCUMENTS

| | | |
|---|---|---|
| JP | H11253107 | 9/1999 |
| WO | WO9726801 A1 | 7/1997 |
| WO | WO2012122594 A1 | 9/2012 |

* cited by examiner

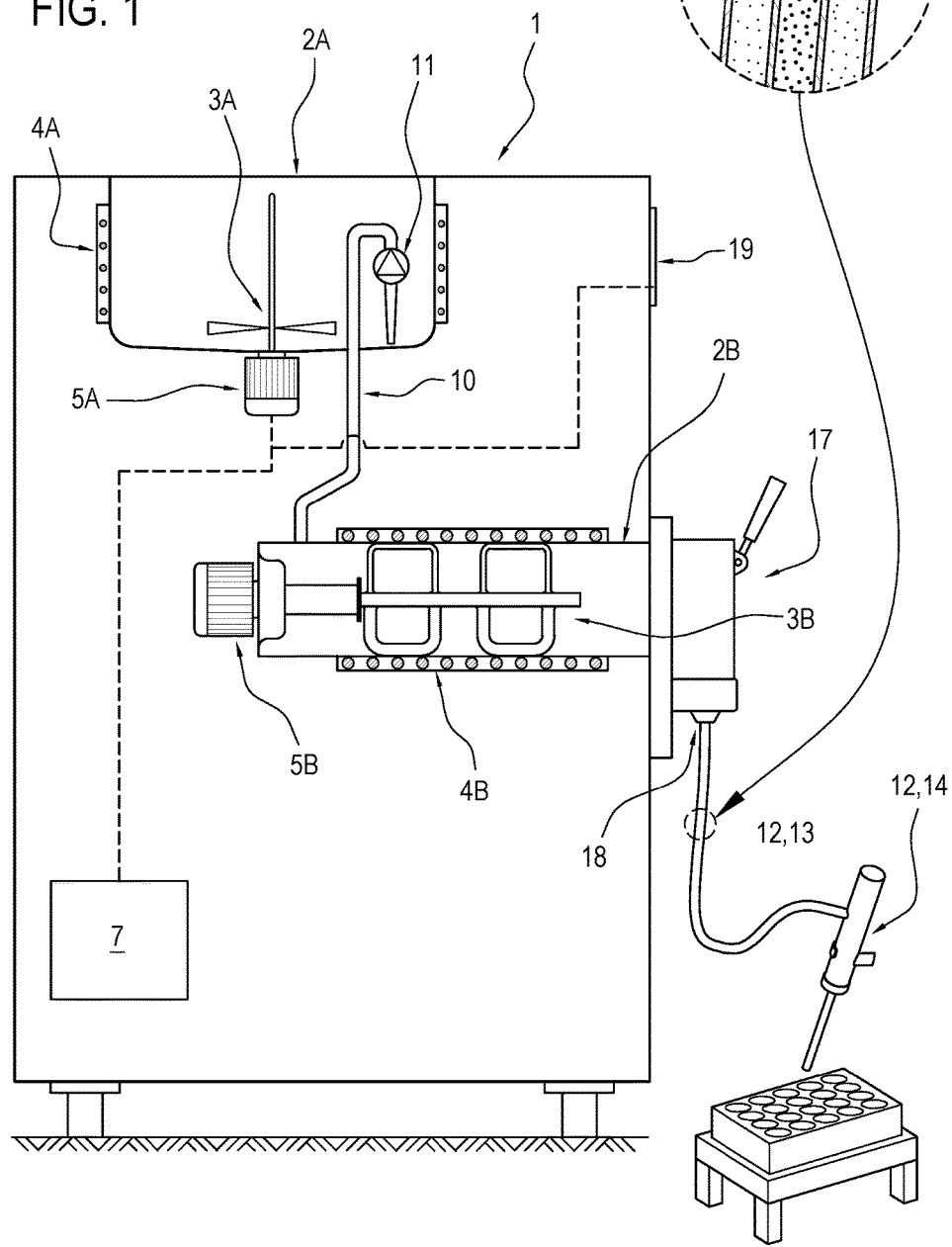

MACHINE AND METHOD FOR MAKING LIQUID OR SEMI-LIQUID PRODUCTS

This application claims priority to Italian Patent Application BO2015A000013 filed Jan. 16, 2015, the entirety of which is incorporated by reference herein.

BACKGROUND OF THE INVENTION

This invention relates to a machine for making liquid or semi-liquid products and to a method for making liquid or semi-liquid products implemented by the machine.

For shops and businesses which sell specific food products, especially liquid or semi-liquid products, made on the premises, such as, for example, patisseries, yogurt parlors, ice cream parlors, milk bars and similar establishments, it may be of fundamental importance to reduce the number of machines used to prepare the products, not only to reduce running costs but also, and above all, to save floor space.

In light of this, a need which has been strongly felt for a long time in the trade is that for a machine for making liquid and semi-liquid products which is particularly versatile and which is therefore capable of making a plurality of products, even different products, and of performing a plurality of different processes on the products.

SUMMARY OF THE INVENTION

This invention therefore has for an aim to meet the above mentioned need by providing a machine for making liquid or semi-liquid products and a method for making liquid or semi-liquid products.

This aim is achieved by a machine and a method for making liquid or semi-liquid products and comprising technical features as set out in the present disclosure.

BRIEF DESCRIPTION OF THE DRAWINGS

The technical features of the invention, with reference to the above aims, are clearly described in the present disclosure and its advantages are apparent from the detailed description which follows, with reference to the accompanying drawings which illustrate a non-limiting example embodiment of the invention and in which:

FIG. 1 is a side view of a machine of this invention for making liquid or semiliquid products;

FIG. 2 is a schematic view of a detail of the aforementioned machine.

DESCRIPTION OF THE PREFERRED EMBODIMENTS

With reference to the accompanying drawings, the numeral 1 denotes a machine for making liquid or semi-liquid products.

It should be noted that the machine is capable of making a plurality of desired liquid or semi-liquid products which are finished (that is, ready for immediate consumption) or intermediate (to undergo further processing, for example in different machines).

Preferably, but not necessarily, the machine 1 is adapted to make ice cream products, artisan gelato, bases for stick ice creams, bases for mousse or bavaroise, mixes for chilled desserts, sorbets, mixes for ice cream cakes, zuccotto puddings, chilled patisserie products, and so on.

The machine 1 for making liquid and semi-liquid products comprises:

a first container 2A for processing basic liquid and semi-liquid products;
a first mixer 3A operating inside the first processing container 2A (and adapted to rotate inside the first processing container 2A;
a second container 2B for processing the basic liquid and semi-liquid products, for converting the basic liquid and semi-liquid products into a desired liquid or semi-liquid product (either finished or intermediate);
a second mixer 3B operating inside the second processing container 2B;
a thermal system comprising at least a first heat exchanger 4A and a second heat exchanger 4B, which are operatively associated respectively with the first container 2A and with the second processing container 2B for exchanging heat with the basic liquid or semi-liquid products or with the desired liquid or semi-liquid product in the first container 2A or the second container 2B;
a first drive unit 5A operating on the first mixer 3A for driving its rotation in the first container 2A;
a second drive unit 5B operating on the second mixer 3B for driving its rotation in the second container 2B.

Preferably, the first container 2A is a tank.

Preferably, the second container 2B is a cylinder.

Preferably, the second container 2B is a batch freezing cylinder.

On the front of it, the second container 2B comprises a dispenser 17.

The dispenser 17 has an outlet end 18.

Preferably, the thermal system is a thermodynamic system (not illustrated), that is, a system operating according to a thermodynamic cycle, that is, based on a heat exchanger fluid subjected to a thermodynamic cycle.

Preferably, the thermal system comprises a compressor (not illustrated).

The machine 1 also comprises a control and operating unit 7, configured to control the first drive unit 5A, the second drive unit 5B and/or the thermal system.

The machine 1 also comprises a connecting duct 10 between the first container 2A and the second container 2B, for allowing a batch of basic products to be transferred from the first container 2A to the second container 2B.

According to the invention, the machine 1 further comprises a separating element 11 for separating the first container 2A and the second container 2B, this element being associated with the duct 10 and switchable between a separating configuration in which the transfer of basic products from the first container 2A to the second container 2B through the duct 10 is prevented, and a connecting configuration in which the transfer of basic products from the first container 2A to the second container 2B through the duct 10 is allowed.

According to another aspect, the separating element 11 is electrically connected to the control and operating unit 7, so that it can be adjusted between the above-mentioned separating and connecting configurations as a function of the type of process being performed (processing step).

According to this aspect, the separating element 11 is provided with an actuator adapted to be activated to allow adjusting the configuration of the element itself.

In the embodiment illustrated in FIG. 1, the separating element 11 is a pump and the connecting configuration corresponds to an activation condition of the pump.

The separating configuration in the embodiment of FIG. 1, on the other hand, corresponds to a condition where the pump is deactivated.

In an embodiment not illustrated, the separating element 11 comprises a valve, associated with the duct 10 (to be active along the duct 10) and switchable between a closed configuration corresponding to the separating configuration, and an open configuration corresponding to the connecting configuration.

In this embodiment, the duct 10 is preferably a vertical duct and the transfer of a batch of base product from the first container 2A to the second container 2B occurs by gravity.

According to this aspect, the separating element 11 may comprise a grip element connected to the valve to allow the operator to adjust the configuration of the valve between the closed and the open configuration.

According to this aspect, the separating element 11 is preferably defined by a tap provided with a valve and a grip element.

According to another aspect, the machine 1 comprises a dispensing device 12 provided with:
- a flexible tubular element 13, comprising an inner duct 15 for the transit of the desired product, connected at a first, infeed end to the second container 2B, for receiving the desired product from the second container 2B;
- and a releasing lance 14 connected to a second, outfeed end of the flexible tubular element 13 for releasing the desired product to the outside.

Advantageously, according to this aspect, it is possible to fill molds (for example, for stick ice creams) very quickly and easily and without wasting the desired product.

More specifically, the release lance 14 is preferably provided with a release button which can be activated by a user to allow releasing the product to the outside and deactivated to stop releasing the product.

In the embodiment illustrated in FIG. 2, the flexible tubular element 13 comprises a duct 15 for the transit of the desired product and a further duct 16 for the transit of a different, additional product.

It should be noted that the duct 15 for the transit of the desired product and the further duct 16 for the transit of the different, additional product are distinct and separate from each other.

Preferably, the lance 14 also comprises a duct 15 for the transit of the desired product and a further duct 16 for the transit of a different, additional product (not illustrated).

The ducts 15 and 16, preferably end at the terminal section of the lance 14, so as to allow the product to be partly mixed in the proximity of the outlet of the lance 14 in order to give the released product predetermined aesthetic effects.

Preferably, the different additional product is a liquid product, and more preferably, a syrup.

In the embodiment illustrated in FIG. 2, the duct 15 for the transit of the desired product is located inside the duct 16 for the transit of the different, additional product.

According to another aspect, the transit duct 15 or, alternatively, the lance 14 may have a portion which is radially deformable by the compressive action applied by the user's hand, so as to allow pushing the product towards the outside of the lance 14.

More specifically, the radially deformable portion allows defining a sort of pastry bag.

Described below is another aspect, connected with the processing of the product.

As is known, consistency is one of the parameters normally detected and checked during the processing of liquid or semi-liquid products.

It is evident that the machine 1 described above allows processing products which are very different from each other (liquid or semi-liquid) and which therefore differ greatly in consistency: low consistencies for liquid products and high consistencies for creamier products (such as ice cream, for example).

Preferably, the machine comprises at least a first detecting device, configured to detect a parameter representing low consistency and a second detecting device, configured to detect a parameter representing high consistency.

The control and operating unit 7 is connected to the first and second detecting devices and is also configured to infer a consistency value based on a value detected by the first detecting device or, alternatively, by the second detecting device, (depending on the type of product desired).

Advantageously, according to this aspect, it is possible—based on the type of product desired—to infer a measure of the consistency based on the first or the second detecting device).

It should be noted that the first detecting device allows obtaining high precision and accuracy for measuring relatively low consistency, whilst the second detecting device allows obtaining high precision and accuracy for measuring relatively high consistency.

Advantageously, therefore, for each product being processed, the detecting device used (first or second) is the one which guarantees the greatest precision and accuracy in measuring the consistency, thus making it possible to control the process in a particularly precise and accurate manner.

According to another aspect, the machine 1 comprises a user interface 19, operatively connected to the control unit 7 and provided with controls which can be operated by a user to transmit control signals which allow changes to one or more operating parameters of the first mixer 3A, and/or second mixer 3B, and/or thermodynamic system.

Preferably, the user interface 19 is provided with a viewing device (for example, a display).

The user interface 19 is preferably also equipped with pushbuttons.

It should be noted that the control unit 7 may be configured to provide, on the viewing device, information regarding the process being performed, and more specifically, information needed to step the user through the process (for example, adding one or more ingredients).

This advantageously defines a procedure which allows providing the user of the machine 1 with simple instructions to perform predetermined operations as a function of the progress of the process being performed.

Advantageously, the machine 1 described above allows substituting, that is to say, performs the same functions as, two different machines: a pasteurizer and a batch freezer.

That way, tradespeople who run patisseries, ice cream parlors and similar establishments can save a considerable amount of floor space and reduce costs by purchasing one machine which is capable of making a wide variety of liquid or semi-liquid chilled pastry, ice cream and like products.

The machine 1 can be used to make a variety of different liquid or semi-liquid products, whether finished or intermediate.

It should be noted that the machine 1 allows one or more processes to be performed on a batch of basic products in the first container 2A. During such processes, the separating element 11 is kept in the separating configuration, preventing the basic products from being transferred through the duct 10 to the second container 2B.

At the end of the process/processes on the basic products, the separating element 11 is adjusted to the connecting configuration and the batch of basic products subjected to the process/processes in the first container 2A is transferred into the second container 2B.

Preferably, the batch of basic products is transferred entirely from the first container 2A to the second container 2B, that is, the entire batch of basic products is transferred entirely from the first container 2A to the second container 2B.

According to another aspect, the control unit 7 comprises a memory in which a plurality of parameters (information items) relating to dedicated recipes are stored.

According to this aspect, information stored in the memory and relating to the ingredients to be used for the selected recipe is sent by the control unit 7 to the viewing device for display.

Also according to this aspect, information relating to the time each ingredient must be added is sent by the control unit 7 to the viewing device for display.

According to another aspect, a method for making liquid or semi-liquid product is also defined.

Preferably, the method is implemented in the machine described in the foregoing.

The method comprises the following steps:
preparing a plurality of basic ingredients in the first container 2A which are configured to form a batch of basic product;
adjusting the separating element 11 to the separating configuration;
subjecting the basic ingredients in the first container 2A to a thermal treatment and/or stirring to obtain a batch of basic product, with the separating element 11 positioned in the separating configuration;
adjusting the separating element 11 to the connecting configuration and transferring the batch of basic product from the first container 2A to the second container 2B;
thermally treating and stirring the batch of basic product in the second container 2A for making a batch of desired product.

According to another aspect, the step of thermally treating and stirring the basic product in the second container 2B to make a batch of desired product comprises a step of keeping the basic product, being processed, at a temperature of between −2 and 3° C.

Advantageously, according to this aspect, it is possible to make an intermediate product defining a base for an ice cream, to be made separately, for example in another machine.

For example, this intermediate product can be placed in molds to form a base for a stick ice cream to be made in a blast chiller.

According to yet another aspect, the method comprises a step of making said desired product come out of the second container 2B through a flexible tubular element 13 and a step of making said desired product pass through a shaped outfeed nozzle (connected to the end of the flexible tubular element 13).

Thus, it is advantageously possible, for example, to fill molds or containers very easily because the user can simply move and position the outfeed nozzle wherever needed (for example, directly above the container into which the product is to be released).

According to another aspect, the method comprises a step of detecting a parameter representing consistency by means of a first detecting device for high consistency values and by means of a second detecting device for low consistency values.

The advantages of this aspect are described above. Here, it is confirmed that this makes it possible to obtain a very precise measurement both for products with a relatively low consistency (where the parameter representing consistency is detected by means of the first detecting device) and for products with a relatively high consistency (where the parameter representing consistency is detected by means of the second detecting device).

With reference in particular to a possible process, the step of subjecting the basic ingredients in the first container 2A to thermal treatment and/or stirring comprises a step of subjecting the basic ingredients to thermal treatment by heating.

More precisely, the step of subjecting the basic ingredients in the first container 2A to thermal treatment and/or stirring comprises a step of subjecting the basic ingredients to thermal treatment for pasteurizing it.

With reference to another aspect (preferably for making mousse and bavaroise mixes), during transfer of the mix from the first container 2A to the second container 2B, there is a step of checking the ratio between the air and the basic products transferred through the duct 10.

Further, according to yet another aspect, the step of subjecting the basic ingredients in the first container 2A to thermal treatment and/or stirring comprises a step of adding one or more basic ingredients at preset temperatures reached by the basic product inside the first container 2A.

What is claimed is:
1. A machine for making liquid and semi-liquid products, comprising:
a first container for processing basic liquid and semi-liquid products;
a first mixer operating inside the first container;
a second container for processing the basic liquid and semi-liquid products, for converting the basic liquid and semi-liquid products into a desired liquid or semi-liquid product;
a second mixer operating inside the second container;
a thermal system comprising at least a first heat exchanger and a second heat exchanger, which are operatively associated respectively with the first container and with the second container for exchanging heat with the basic liquid or semi-liquid products or with the desired liquid or semi-liquid product in the first container or the second container;
a first drive unit including a motor operating on the first mixer for driving rotation of the first mixer in the first container;
a second drive unit including a motor operating on the second mixer for driving rotation of the second mixer in the second container;
a control and operating unit, configured to control at least one chosen from the first drive unit, the second drive unit and the thermal system,
a connecting duct connecting between the first container and the second container, for allowing transfer of a batch of basic liquid or semi-liquid products from the first container to the second container;
a separating element for separating the first container and the second container, the separating element being associated with the connecting duct and switchable between a separating configuration in which the transfer of basic liquid or semi-liquid products from the first container to the second container through the duct is prevented, and a connecting configuration in which the transfer of basic liquid or semi-liquid products from the first container to the second container through the duct is allowed;
a dispensing device including:

a flexible tubular element, comprising a first duct for transit of the desired liquid or semi-liquid product, connected at a first, infeed end to the second container, for receiving the desired liquid or semi-liquid product from the second container; and a releasing lance connected to a second, outfeed end of the flexible tubular element for releasing the desired liquid or semi-liquid product to an exterior of the machine;

wherein the flexible tubular element further comprises a further duct for transit of a different additional product, the first duct for the transit of the desired liquid or semi-liquid product and further duct for the transit of the different additional product being separate from each other;

wherein the first duct for the transit of the desired liquid or semi-liquid product is positioned inside the further duct for the transit of the different additional product.

2. The machine according to claim 1, wherein the separating element is electrically connected to the control and operating unit, to be adjusted between the separating and connecting configurations.

3. The machine according to claim 2, wherein the separating element is a pump, and the connecting configuration corresponds to an activation condition of the pump.

4. The machine according to claim 1, wherein the separating element comprises a valve, associated with the connecting duct and switchable between a closed configuration corresponding to the separating configuration, and an open configuration corresponding to the connecting configuration.

5. The machine according to claim 1, and further comprising a user interface, operatively connected to the control and operating unit and including controls which can be operated by a user to transmit control signals for changing at least one operating parameter of at least one chosen from the first mixer, the second mixer, and the thermal system.

6. A method for making a liquid or semi-liquid product, comprising:

providing a first container for processing basic liquid and semi-liquid products;

providing a first mixer operating inside the first container;

providing a second container for processing the basic liquid and semi-liquid products, for converting the basic liquid and semi-liquid products into a desired liquid or semi-liquid product;

providing a second mixer operating inside the second container;

providing a thermal system comprising at least a first heat exchanger and a second heat exchanger, which are operatively associated respectively with the first container and with the second container for exchanging heat with the basic liquid or semi-liquid products or with the desired liquid or semi-liquid product in the first container or the second container;

providing a first drive unit including a motor operating on the first mixer for driving rotation of the first mixer in the first container;

providing a second drive unit including a motor operating on the second mixer for driving rotation of the second mixer in the second container;

providing a control and operating unit, configured to control at least one chosen from the first drive unit, the second drive unit and the thermal system, providing a connecting duct connecting between the first container and the second container, for allowing transfer of a batch of basic liquid or semi-liquid products from the first container to the second container;

providing a separating element for separating the first container and the second container, the separating element being associated with the connecting duct and switchable between a separating configuration in which the transfer of basic liquid or semi-liquid products from the first container to the second container through the duct is prevented, and a connecting configuration in which the transfer of basic liquid or semi-liquid products from the first container to the second container through the duct is allowed;

providing a dispensing device including:

a flexible tubular element, comprising a first duct for transit of the desired liquid or semi-liquid product, connected at a first, infeed end to the second container, for receiving the desired liquid or semi-liquid product from the second container; and a releasing lance connected to a second, outfeed end of the flexible tubular element for releasing the desired liquid or semi-liquid product to an exterior of the machine;

wherein the flexible tubular element further comprises a further duct for transit of a different additional product, the first duct for the transit of the desired liquid or semi-liquid product and further duct for the transit of the different additional product being separate from each other;

wherein the first duct for the transit of the desired liquid or semi-liquid product is positioned inside the further duct for the transit of the different additional product;

preparing a plurality of basic ingredients in the first container which are configured to form a batch of basic product;

adjusting the separating element to the separating configuration;

subjecting the plurality of basic ingredients in the first container to at least one chosen from thermal treatment and stirring to obtain the batch of basic product, with the separating element positioned in the separating configuration;

adjusting the separating element to the connecting configuration and transferring the batch of basic product from the first container to the second container;

thermally treating and stirring the batch of basic product in the second container for making a batch of desired product.

7. The method according to claim 6, wherein the step of thermally treating and stirring the basic product in the second container to make the batch of desired product comprises keeping the basic product, while being processed, at a temperature of between −2 and 3° C.

8. The method according to claim 6, and further comprising a step of making the desired product come out of the second container through a flexible tubular element and a step of making the desired product pass through a shaped outfeed nozzle.

9. The method according to claim 6, wherein the step of adjusting the separating element to the connecting configuration and transferring the batch of basic product from the first container to the second container comprises transferring all of the batch of basic product from the first container to the second container.

* * * * *